UNITED STATES PATENT OFFICE.

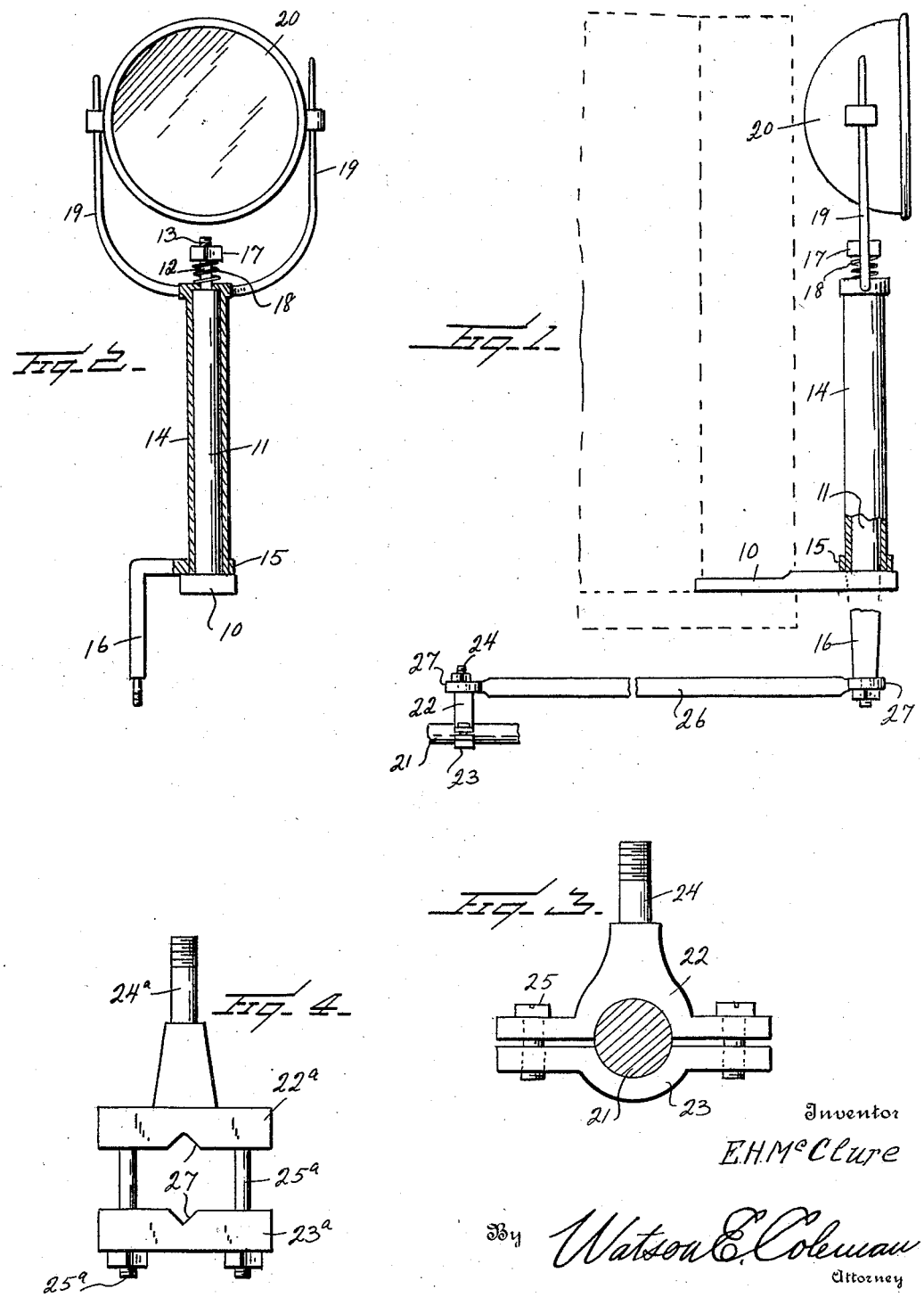

EDWARD H. McCLURE, OF YAMPA, COLORADO.

DIRIGIBLE-HEADLIGHT ATTACHMENT.

1,318,504.   Specification of Letters Patent.   Patented Oct. 14, 1919.

Application filed June 14, 1919. Serial No. 304,208.

*To all whom it may concern:*

Be it known that I, EDWARD H. MCCLURE, a citizen of the United States, residing at Yampa, in the county of Routt and State of Colorado, have invented certain new and useful Improvements in Dirigible-Headlight Attachments, of which the following is a specification, reference being had to the accompanying drawings.

This invention relates to means for causing a headlight mounted on an automobile to turn in correspondence with the steering wheels of the machine, and particularly to that class of devices of this character wherein the headlight is mounted upon a rotatable member and operatively connected to the steering arm or steering system of the automobile.

The general object of my invention is to provide a very simple attachment for this purpose which may be applied to any automobile, which will support any form of headlight, and whereby one of the headlights of the car may be caused to turn in correspondence with the turning of the steering wheels of the machine, while the other headlight remains fixed and directs its light forward.

A further object is to provide a device of this character which is very simple in construction, which may be cheaply manufactured, which is not liable to get out of order, and which has been found thoroughly effective in practice.

My invention is illustrated in the accompanying drawings, wherein:—

Figure 1 is a side elevation of the headlight attachment;

Fig. 2 is a front view, partly in section, of the attachment;

Fig. 3 is a face view of one form of clamp; and

Fig. 4 is an elevation of another form of clamp.

Referring to these drawings, it will be seen that my attachment comprises a base 10 which is of metal and so formed that it may be applied to any desired portion of the frame of the automobile and held thereto by clips, screws, bolts, or other suitable devices. One end of this base 10 is provided with the upwardly extending, solid, cylindrical post 11 which is reduced at its upper end so as to form an upwardly extending stud 12, screw-threaded at 13.

Loosely disposed over this post 11 and rotatable thereon is a sleeve or tube 14 which has a transverse web at its upper end having a small opening through which the stud 12 projects. Mounted on the lower end of this sleeve or tube 14 is a collar 15, from which extends an angular arm 16 having a stud at its lower end. Mounted upon the screw-threads 13 is a nut 17, and disposed between the nut and the upper end web of the tubular member 14 is a coiled compression spring 18. By turning this nut, the pressure of the spring may be increased or decreased and the sleeve 14 held with greater or less strength against the base 10. The upper end of the sleeve 14 carries upwardly and divergently extending yoke arms 19 within which any desired type of headlight, search light, or other lamp may be supported in the usual manner.

Attached to the steering arm 21 of the vehicle is a two-part clamp comprising the coacting and confronting members 22 and 23, between which the steering arm is clamped, the member 22 being formed with an upwardly projecting, screw-threaded stud 24. These two members 22 and 23 are held together by bolts 25. Connecting the crank arm 16 with the stud 24 is a connecting rod 26 having eyes 27 at its opposite ends, one of these eyes embracing the stud 24 and being held thereon by a nut, while the other eye is held upon the stud at the lower end of the arm 16 by means of a nut.

While in Fig. 3 I have shown a clamp composed of the members 22 and 23 which is adapted for engagement with cylindrical steering arms, yet in Fig. 4 I show a modification of this, wherein the members 22$^a$ and 23$^a$ are formed with angular notches 27 adapted to embrace and clamp against a steering arm having an irregular form. These two members 22$^a$ and 23$^a$ may be urged toward each other by bolts 25$^a$, and the member 22$^a$ is provided with the upwardly extending post having a screw-threaded terminal end 24$^a$. In all other respects the construction is the same as that heretofore described.

It will be seen that my invention is very simple, may be easily applied, may be applied to practically all cars, may be used with any desired headlight, and that the parts may be readily disengaged from each other. It is obvious that the details of construction might be modified in many ways without departing from the spirit of the invention.

I claim:—

A dirigible headlight attachment for automobiles comprising a base adapted to be attached to the frame of the automobile and having an upwardly extending, cylindrical post at one end terminating in a stud of relatively small diameter and screw-threaded at its extremity, a tubular sleeve fitting over this post and having an aperture at its upper end through which the stud projects, a nut on the extremity of the stud, a spring engaging the sleeve, upwardly extending, divergent arms mounted on the upper end of the sleeve and adapted to support a headlight between them, the lower end of the spring being provided with an angular arm, a clamp adapted to be applied to the steering arm of the vehicle, and a rod operatively connecting the clamp to the angular arm on the sleeve.

In testimony whereof I hereunto affix my signature in the presence of two witnesses.

EDWARD H. McCLURE.

Witnesses:
CHAS. J. WHEELER,
P. TRELEVEN.

Copies of this patent may be obtained for five cents each, by addressing the "Commissioner of Patents, Washington, D. C."